United States Patent [19]
Yano et al.

[11] Patent Number: 4,522,372
[45] Date of Patent: Jun. 11, 1985

[54] ELECTROMAGNETIC VALVE

[75] Inventors: Kiyotoshi Yano, Aki; Yutaka Suzuki, Nishio; Yoshichika Yamada, Kuwana, all of Japan

[73] Assignee: Nippondenso Co., Ltd., Kariya, Japan

[21] Appl. No.: 554,108

[22] Filed: Nov. 21, 1983

[30] Foreign Application Priority Data

Jan. 18, 1983 [JP] Japan .................................. 58-7089

[51] Int. Cl.³ ............................................. F16K 31/06
[52] U.S. Cl. .................................. 251/141; 251/129; 335/259; 335/264
[58] Field of Search ...................... 251/129, 141, 205; 335/259, 264, 265

[56] References Cited

U.S. PATENT DOCUMENTS 2,411,778  11/1946  De Wilde ............................. 335/264
3,961,298   6/1976  Jaffe et al. ........................... 335/259
4,210,167   7/1980  Koppe et al. ....................... 251/141 X

FOREIGN PATENT DOCUMENTS 57-65834  4/1982  Japan .

Primary Examiner—Samuel Scott
Assistant Examiner—Kenichi Okuno
Attorney, Agent, or Firm—Cushman, Darby & Cushman

[57] ABSTRACT

An electromagnetic valve which can control a fluid flow in dual mode, i.e. a small amount of fluid at a first step and a large amount of fluid at a second step, which adopts a bypass means of magnetic flux for obtaining the first step and a resistance means that does not allow the magnetic flux to flow in the first step while it allows it to flow in the second step for obtaining the second step.

2 Claims, 4 Drawing Figures

ELECTROMAGNETIC VALVE

BACKGROUND OF THE INVENTION

The present invention relates to an electromagnetic valve which is capable of controlling the fluid flow in dual mode, i.e. a small amount of fluid at one time and a large amount of fluid at the other time, in response to the electric signals applied. In particular, the electromagnetic valve of the present invention is useful in controlling the amount of auxiliary air to be supplied to automobile engines.

The conventional electromagnetic valve of a single coil and a single moving core type can only open or close the fluid passage according to the electric signal, or continuously change the cross-sectional areas of the fluid passage in accordance with the electric signal applied. In other words, there was no single electromagnetic valve that could control the fluid passage in dual mode. In the past, to control the fluid passage in dual step two independent electromagnetic valves were provided as shown for example in the Japanese laid-open patent application No. 57-65834. The arrangement however needs two coils, two moving cores and the like, resulting in an expensive device.

SUMMARY OF THE INVENTION

The primary object of the present invention is to provide a single electromagnetic valve which can control the fluid passage in dual step.

To accomplish the purpose above, the present invention adopts the following construction. There is provided a resistance means between a yoke encasing the coil and a moving core provided in the coil to give a magnetic resistance to the magnetic flux passing from the yoke to the moving core. Also there is provided a bypass means between the yoke and the moving core to have the magnetic flux bypass the resistance means. The bypass means is selected such that the magnetic flux passing the means saturates at a certain level of magnetic flux.

The general operational mode of the valve above constructed is as follows. When the current to be applied to the coil is below the predetermined level, the magnetic flux generated at the coil is small, therefore the magnetic flux flows from the yoke to the moving core via the bypass means, thereby moving the moving core to the first position where the first step is completed. When the current increases afterwards, the first position is kept maintained, since the moving core does not move due to the existance of the bypass means, which limits the magnetic flux passing therethrough. When the current increases further, the magnetic flux generated by the coil increases further to break the resistance means, thereby passing the magnetic flux over the resistance means from the yoke directly to the moving core. Thus the moving core completes the second step.

The electromagnetic valve above constructed needs a space only for a single valve as opposed to a larger space needed in the conventional device. Also the compact valve of the present invention is usable with a simple piping for the fluid to be controlled and with simple electric lead wires as opposed to the conventional valves.

DETAILED DESCRIPTION OF THE PREFERRED EMBODIMENT

Figure 1:
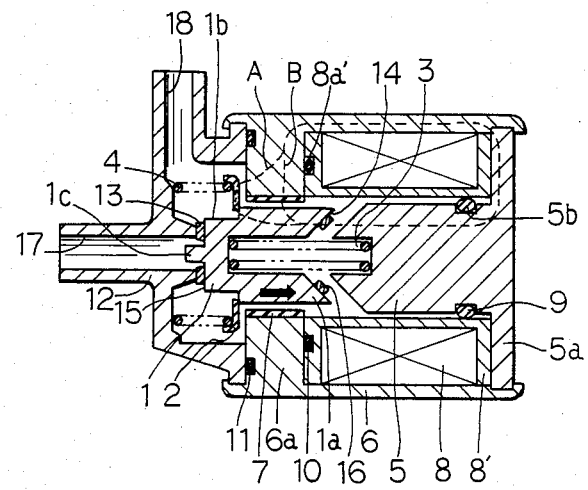
FIG. 1 is a cross-sectional view of an embodiment of the present invention.

An embodiment of the present invention is explained below. In FIG. 1, numeral 8 designates a coil which is wound around a plastic-made bobbin 8'. The magnetic circuit of this coil 8 is formed through a stator core 5, yoke 6, a moving plate 2 and a moving core 1. The magnetic circuit is, as indicated, made to bypass the direct connection between the yoke 6 and the moving core 1 by the moving plate 2. The parts above are made of magnetic materials. The thickness of the moving plate 2 is relatively small and passes only a part of the magnetic flux generated in the magnetic circuit of the coil 8.

The coil 8 (bobbin 8') is assembled around the stator core 5 through an O ring 9. The axial ends of the coil 8 (bobbin 8') are fixed at a shoulder 6a of the yoke 6 via an O ring 10 and a flange 5a of the stator core 5 respectively.

There is provided a resistance means, i.e. a sleeve 7 made from a nonmagnetic material at a position between an inner periphery of the shoulder 6a of the yoke 6 and an outer periphery of the moving core 1, being fixed at its outer peripheral portion to the inner periphery of the shoulder 6a of the yoke 6. The resistance means or the sleeve 7 guides the moving core 1 which reciprocates therein, and functions as a means to prevent the magnetic flux from passing directly from the yoke 6 to the moving core 1.

The moving core 1 is formed to be a circular column stepped at a position shown in FIG. 1 so that the large diameter portion 1a of the same is guided by the sleeve 7. The small diameter portion 1b of the core 1 supports the moving plate 2 together with the stepped portion, when the coil 8 is not energized. There is provided a control rod 1c at the end of the small diameter portion 1b. The control rod 1c controls the cross-sectional area of the outlet port 17. At the ends 14 and 15 there are provided rubber valve bodies 16 and 13 by baking respectively. The rubber valve 13 is for sealing the open end of the outlet port 17, and the rubber valve 16 at the side of the stator core 5 is for eliminating the residual magnetism remaining when the current is cut off and also for suppressing the operational noises from the moving core. The sealing of the open end of the outlet port 17 is accomplished by the pushing of the rubber valve 13 due to the different forces of the springs 4 and 3. The spring force of the spring 3 is larger than that of the spring 4.

The assembling process of the electromagnetic valve of the above is explained below. First, the O ring 9 is inserted into a groove 5b of the stator core 5 and then the bobbin 8' with the coil 8 wound therearound is put together. Then O ring 10 is inserted into a groove 8'a of the bobbin 8' to assemble thereafter the yoke 6 with the sleeve 7 inserted tight. After that the spring 3, moving core 1, moving plate 2 and O ring 11 are assembled. In the condition above, the spring 4 and the valve seat 12 are put in place to finally fix all the parts by bending the ends of the yoke 6 to the valve seat 12 and the stator core 5.

Next, an idle-speed increasing system in an engine with an electronic fuel injection device mounting the valve above explained is discussed. Recently there is a trend to set the idling speed low to improve the fuel economy. Therefore when the head lights are lit, when the windshield wiper is turned on or when other energy consuming devices are put on, there sometimes occurs an engine stop. Therefore it is necessary to increase the idling speed by 100 to 150 rpm when the electric load of the type above is put on to prevent the engine stop. Likewise, it is necessary to increase the idling speed by 400 to 500 rpm when the air conditioner switch is turned on to increase the cooling capacity at the idling. The device for increasing the idling speed is mounted around the throttle valve for the engine. An air bypass passage is attached to bypass the throttle valve mounted in an intake pipe to the engine, and an air valve is placed in the bypass passage to control the air flow flowing into the engine through the bypass passage. When the additional air is supplied into the engine, the air flow sensor senses it and increases the amount of fuel to be injected accordingly, thus resulting in the increase of the idling speed as desired.

The electromagnetic valve of the present invention of the above construction is applied to the air bypass passage in such a way that the inlet port 18 of the valve seat 12 is connected with the upstream of the throttle valve and the outlet port 17 is connected with the downstream of the throttle valve. Connecting the outlet port 17 with the vacuum side as the above is advantageous to the sealing at the rubber valve body 13.

Figure 2:
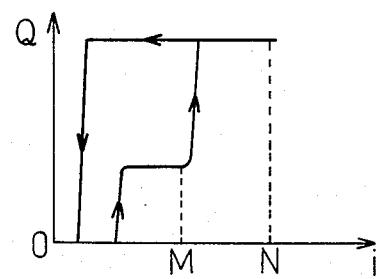
FIG. 2 is a graph showing the operational mode of the embodiment shown in FIG. 1.
Figure 3:
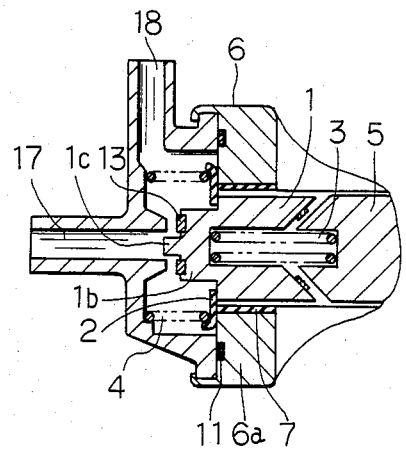
FIG. 3 is a cross-sectional view of a part of the embodiment in FIG. 1, when it is in the first step.

When the electric current to be applied to the coil 8 is increased gradually, the moving plate 2 is pulled toward the yoke 6 by the magnetic flux of A since the distance between the moving plate 2 and the yoke shoulder 6a is set substantially smaller than that between the moving core 1 and the stator core 5. Then, when the pulling force applied to the moving plate 2 by the magnetic flux A exceeds the differential force between the spring forces of the springs 3 and 4, the moving plate 2 is contacted with the end face of the shoulder 6a to become the condition as shown in FIG. 3. (The condition shown at M in FIG. 2.) In this condition, the cross-sectional area of the outlet port 17 is reduced by the cross-sectional area of the control rod 1c. The relatively smaller outlet port supplies an additional air suitable for the increase of the idling speed supporting the use of the electric power.

Even if the current is increased thereafter a little further, the magnetic flux passing the moving plate 2 does not increase much, for the thickness of the moving plate 2 is set small to be in the range of from 0.1 mm to 0.3 mm, cousing saturation relatively earlier. At this time the magnetic flux generated by the coil 8 does not break the sleeve 7 to have the magnetic flux pass directly.

Figure 4:
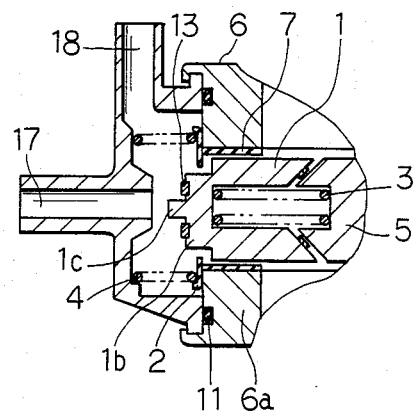
FIG. 4 is a cross-sectional view of a part of the embodiment in FIG. 1, when it is in the second step.

However, when the current is increased further, the magnetic flux B passing through the sleeve 7 increases gradually, utilizing the broad facing areas. And then, when the magnetic force by the magnetic flux B overcomes the spring forces and pulling force between the moving plate 2 and the moving core 1 by the magnetic flux B, the moving core 1 is further pulled to the stator core 5 off the moving plate 2 to result in the condition as shown in FIG. 4. (The condition shown at N in FIG. 2.) In this condition, the outlet port 17 is full-open to supply much additional area to the engine, thus increasing the idling speed to be suitable for the operation of the air conditioners.

When the current to the coil 8 is cut off, the moving core 1 moves to the position closing the outlet port 17 together with the moving plate 2 by the spring force of the spring 3.

It is necessary to adopt a thicker rubber valve body at the numeral 14 to operate the valve in dual mode upon deenergization also, which reduces the effect of the residual magnetism. When thus constructed, the dual mode operation is made possible also upon deenergization for the magnetic hysteresis decreases.

What we claim is:

1. An electromagnetic valve having a single coil through which an electric current is applied, a yoke encasing said coil, a stator core positioned in said coil for passing the magnetic flux generated by said coil therethrough, a moving core positioned in the vicinity of said stator core for passing said magnetic flux therethrough to be moved in response to said electric current applied to said coil, and a fluid passage with an inlet port and an outlet port to be controlled by the movement of said moving core, further comprising:

first means through which said magnetic flux generated by said coil with a first level of current passes for moving said moving core to a first position, and second means through which the magnetic flux generated by said coil with a second level of current passes as a primary passage for moving said moving core to a second position, wherein said moving core controls said fluid passage to a first cross-sectional area in said first position, and to a second cross-sectional area in said second position, and wherein said first means includes a moving plate carried by said moving core and positioned apart from a shoulder of said yoke when said coil is not energized, and said second means includes a sleeve positioned between said shoulder and said moving core, such that said moving plate moves to contact said shoulder, pushing said moving core to said first position when said first level of current is applied, and said moving core moves to said second position to be apart from said moving plate when said second level of current is applied over said sleeve.

2. An electromagnetic valve as claimed in claim 1, further comprising a control rod integral with said moving core, said control rod switches said cross-sectional areas of said fluid passage by moving into and out of said outlet port in response to the movement of said moving core.

* * * * *